Oct. 1, 1929.　　W. J. McCLURE ET AL　　1,730,282
MOTOR VEHICLE
Filed Oct. 5, 1927　　4 Sheets-Sheet 1
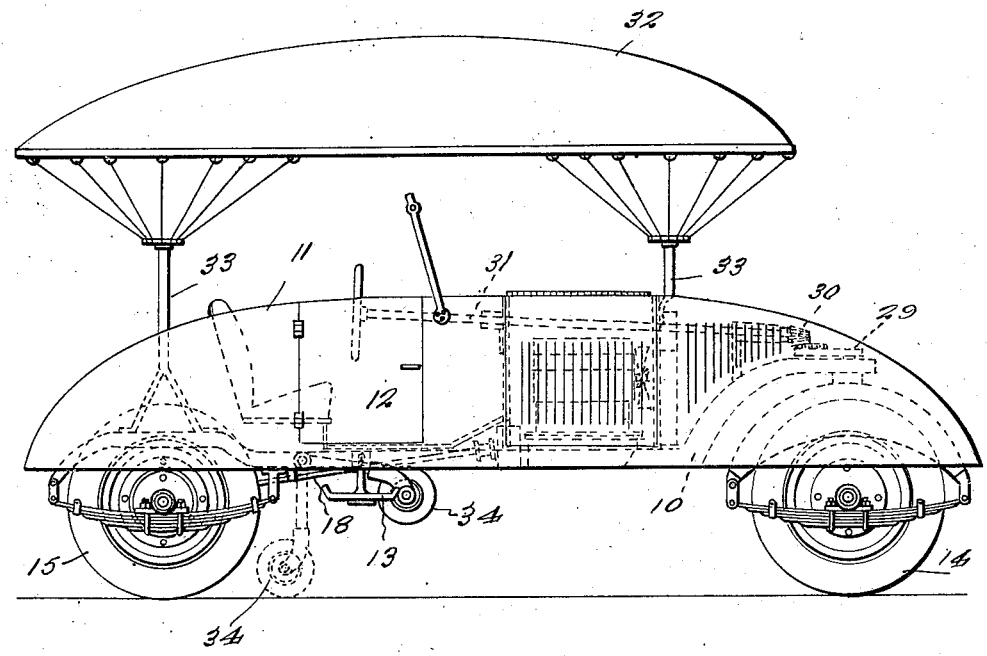
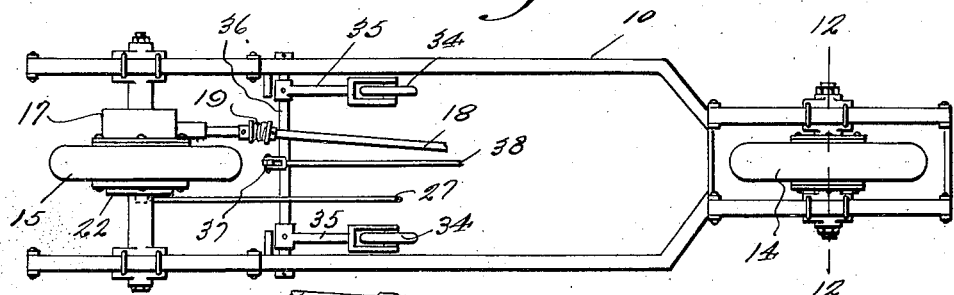
W. J. McClure
A. F. Klutz.
INVENTOR
BY Victor J. Evans
ATTORNEY
WITNESS:
R. A. Thomas Oct. 1, 1929.  W. J. McCLURE ET AL  1,730,282
MOTOR VEHICLE
Filed Oct. 5, 1927  4 Sheets-Sheet 2
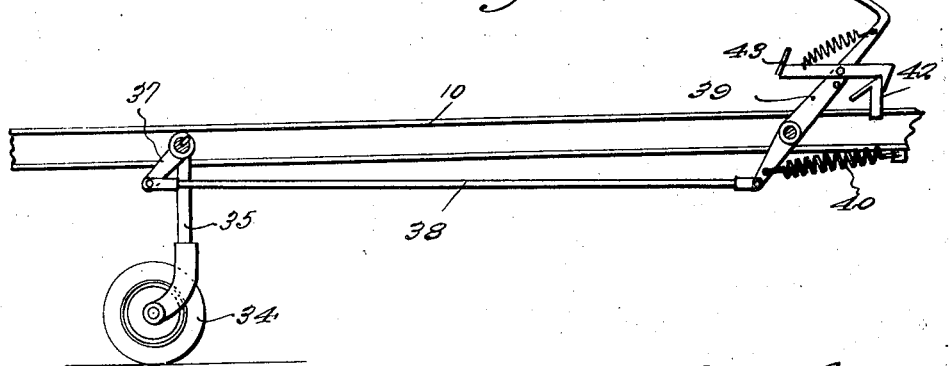
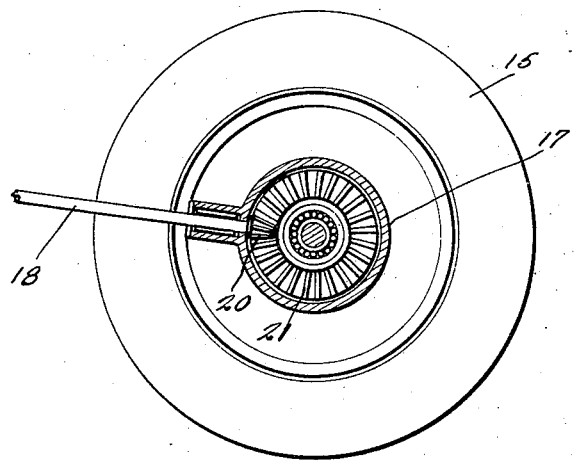
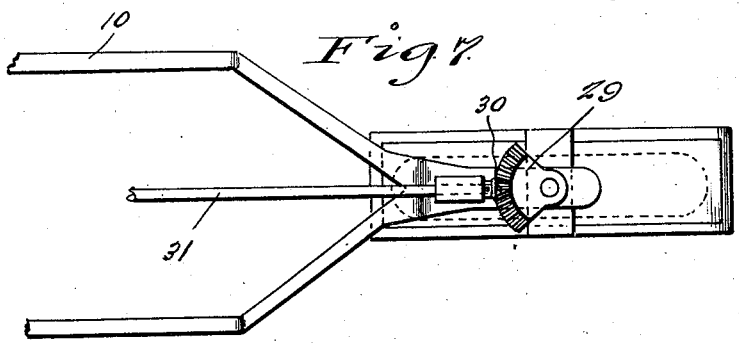
W. J. McClure
A. F. Klutz   INVENTOR Oct. 1, 1929.  W. J. McCLURE ET AL  1,730,282
MOTOR VEHICLE
Filed Oct. 5, 1927    4 Sheets-Sheet 3

W. J. McClure
A. F. Klutz
INVENTOR

BY *Victor J. Evans*

ATTORNEY

Oct. 1, 1929.  W. J. McCLURE ET AL  1,730,282
MOTOR VEHICLE
Filed Oct. 5, 1927  4 Sheets-Sheet 4

W. J. M<sup>c</sup> Clure
A. F. Klutz
INVENTOR

BY *Victor J. Evans*

WITNESS: R. G. Thomas

ATTORNEY

Patented Oct. 1, 1929

1,730,282

UNITED STATES PATENT OFFICE

WILLIAM J. McCLURE AND AUSTIN FLINT KLUTZ, OF MAIDEN, NORTH CAROLINA

MOTOR VEHICLE

Application filed October 5, 1927. Serial No. 224,211.

This invention relates to motor operated vehicles, and contemplates a construction including one or two wheels in combination with means for properly balancing the machine for use, and also utilizing normally elevated balancing wheels which are called into use and lowered into engagement with the ground when the machine is brought to a stop.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the vehicle constructed in accordance with one embodiment of the invention.

Figure 2 is a top plan view of the running gear.

Figure 3 is a sectional view showing the brake mechanism.

Figure 4 is a fragmentary view showing how the balancing wheels for the vehicle are raised and lowered with relation to the ground.

Figure 5 is a view showing the arrangement of the different foot operated pedals.

Figure 6 is a detail sectional view of the driving means.

Figure 7 is a fragmentary plan view of the steering means.

Figure 8:
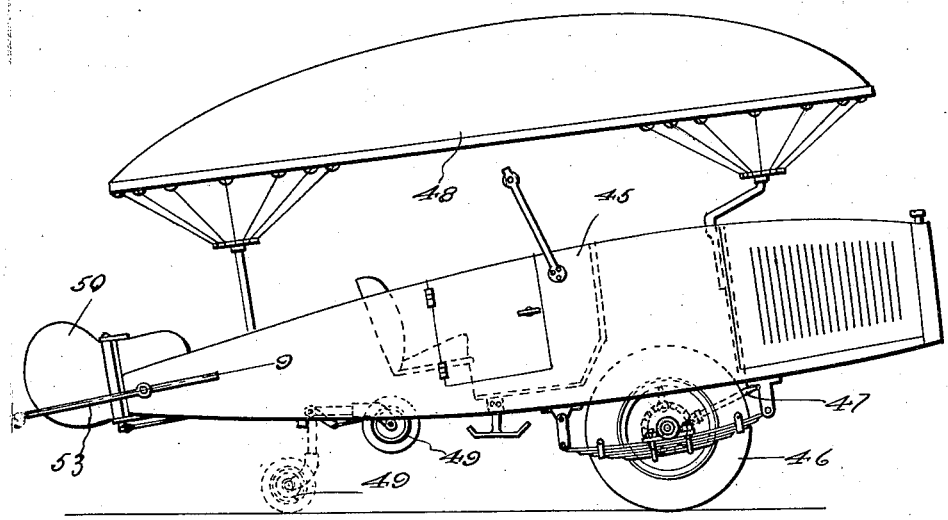
Figure 8 is a view similar to Figure 1 of the modified construction.

Referring to the drawings in detail and more particularly to Figures 1 to 7 inclusive, 10 represents generally the frame of the vehicle upon which is mounted the body 11. The body may vary in shape or design, being provided with a door 12 and step 13 so that the occupant may easily enter or leave the vehicle. In accordance with the embodiment of the invention, the vehicle is mounted on but two wheels, the front wheel 14 and the rear wheel 15, the differential housing for the latter being indicated at 17 which is arranged immediately adjacent the side of the wheel as shown in Figure 2. A shaft 18 including the universal joint 19 enters the differential housing 17 as shown in Figure 6 and is provided with a pinion 20 which meshes with the gear 21. At the other side of the wheel 15 is a brake housing 22 within which are arranged a pair of pivoted brake shoes 23 normally held contracted by a spring 24. Positioned between the adjacent ends of the shoe is a cam 25 carried by a lever 26, the latter being connected with a brake operating rod 27 operated by a brake pedal 28. When the brake pedal is depressed the cam is operated to expand the brake shoes against the brake housing as will be readily understood.

The front wheel 14 of the vehicle is provided with a toothed segment 29 and meshing therewith is a pinion 30 carried by a steering rod 31 which can be operated in any suitable manner from a point adjacent the driver's seat of the vehicle.

For the purpose of balancing the vehicle while in motion, we make use of a gas filled bag 32 arranged above the body 11 of the machine and suitably connected with spaced standards 33 as clearly shown in Figure 1. For balancing the machine while the latter is at rest, we employ a pair of normally elevated balancing wheels 34 journaled on spaced arms 35 carried by a transverse shaft 36. A crank arm 37 is connected with the adjacent ends of an operating rod 38, the forward end of which is connected with the shank of a foot operated pedal 39 clearly illustrated in Figure 4. A spring 40 is connected with the frame of the machine and also with the shank 39 of this pedal and functions to normally hold the wheels 34 elevated as shown by full lines in Figure 1. It is of course to be understood that the wheels 34 are lowered into engagement with the ground just before the machine is brought to a stop, and remains in this position as long as the machine is at rest. For the purpose of holding the wheels 34 in engagement with the ground, we employ a keeper 42 which is engaged by a spring influenced latch 43 carried by the shank of the pedal 41. When the latch is released from the keeper 42, the spring 40 functions to move the wheels 34 to their elevated position. It will be noted upon inspection of Figure 5 that the pedal 41 is arranged in close proximity to the brake pedal 28, so that the ground engaging wheel can be lowered into engagement with the ground incident to the application of the brakes, or the brake can be applied without effecting the balancing wheels 34. In other words, the brake pedals 28 and 41 respectively can be operated independently or simultaneously by reason of their relative arrangement. The pedal 44 indicates the clutch pedal.

Figure 9:
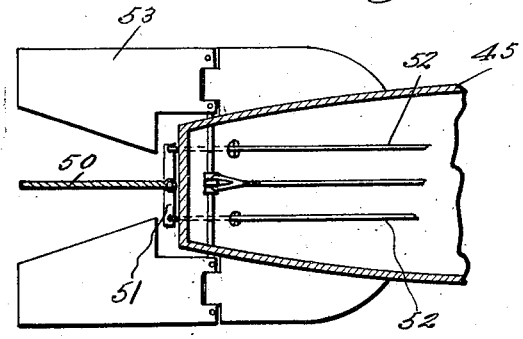
Figure 9 is a fragmentary sectional view of the steering mechanism.
Figure 10:
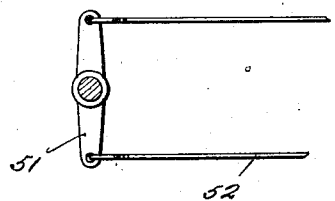
Figure 10 is a detail view of the rudder operated means.

In Figures 8 to 10 inclusive, we have illustrated a modified form of the invention, wherein the body 45 of the vehicle is designed to simulate an airplane and is mounted upon one wheel indicated at 46. This wheel is driven by a motor, the drive shaft being indicated at 47. In this form of the invention use is made of a gas filled bag or sack 48 for balancing the machine while in motion, balancing wheels 49 of the same construction as the wheels 34 and controlled in the same manner as hereinabove described in connection with the wheels 34 being also employed. However, in this form of the invention, the vehicle is steered by a rudder 50 associated with the cross member 51 which is operated from a remote point by an operating rod or cable 52. Also arranged at the opposite sides of the rudder 50 are planes or wings 53 which can be adjusted to slightly elevate the adjacent end of the vehicle from the ground when the vehicle is in motion.

Figure 11:
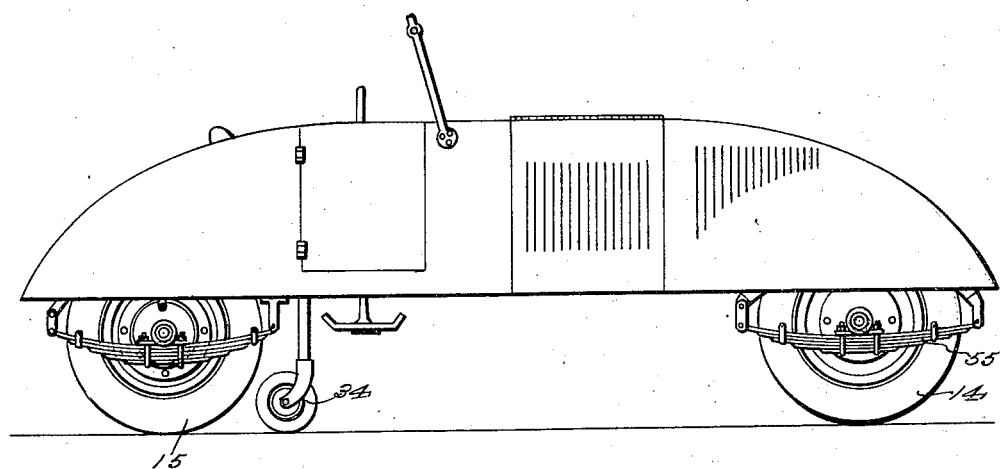
Figure 11 is a side elevation of the vehicle in Figure 1 showing the gas bag or sack omitted.

In Figure 11, the vehicle shown is identical with the form of the invention shown in Figure 1, except that the gas bag 32 is omitted. In this form of the invention the vehicle includes wheels 14 and 15 with the latter operated to drive the vehicle, the vehicle being supported without the bag after the manner of the ordinary motorcycle or two wheeled vehicle. The balancing wheels 34 may be brought into use when the vehicle is standing and when the vehicle is under way and has gained sufficient momentum, the wheels may be raised in the manner previously described. When it is desired to stop, the speed of the vehicle is slackened and the wheels 34 lowered so that when the vehicle comes to a complete stop, the wheels 34 will balance and support the vehicle.

Figure 12:
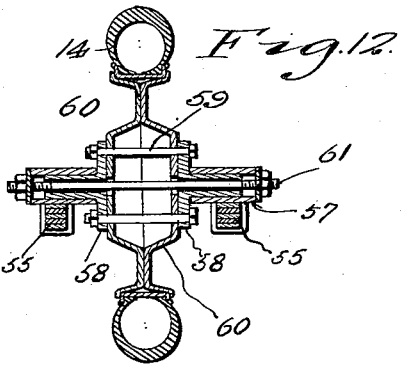
Figure 12 is a sectional view taken substantially on the line 12—12 of Figure 2.
Figure 13:
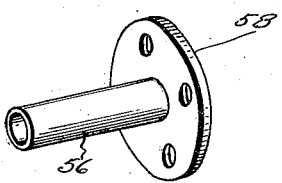
Figure 13 is a detail view of one of the wheel spindles.

The wheel 14 is detachably mounted so as to provide for changing tires where pneumatic tires are used. For this purpose, the wheel which is supported between springs 55 has extending from opposite faces hollow spindles 56. These spindles are rotatably mounted in bearings 57 carried by the springs 55 and the inner ends of these spindles are provided with flanges 58. Bolts 59 extend through the wheel and through the flanges 58 and by removing these bolts, the wheel may be removed for the purpose of changing a tire or for other purposes. Where the wheel is of the disk type as shown in Figure 12 of the drawings, the bolts 59 may also serve to secure the two members 60 of the wheel together, and when these members are separated, the tire may be readily demounted or replaced. A bolt 61 extending through the spindles and wheel serves to hold the parts assembled and to prevent relative lateral movement.

While it is believed that from the foregoing description, the nature and advantages of the invention will be readily apparent, we desire to have it known that we do not limit ourselves to what is herein shown and described, and that such changes may be resorted to when desired as fall within the scope of what is claimed.

What is claimed is:—

A vehicle of the character described comprising a motor operated wheeled frame, with the wheels being arranged in longitudinal alignment, a body supported on said frame, standards rising from said body at appropriate points in its length, and a gas filled bag attached to the standards and arranged above the body and longitudinally thereof throughout the major portion of its length for balancing the vehicle when the latter is in motion.

In testimony whereof we affix our signatures.

AUSTIN FLINT KLUTZ.
WILLIAM JOSEPH McCLURE.